United States Patent
Bloch et al.

(10) Patent No.: US 7,263,687 B2
(45) Date of Patent: Aug. 28, 2007

(54) OBJECT-ORIENTED ENUMERATED TYPE FACILITY

(75) Inventors: Joshua J. Bloch, San Jose, CA (US); Neal M. Gafter, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 510 days.

(21) Appl. No.: 10/237,941

(22) Filed: Sep. 9, 2002

(65) Prior Publication Data

US 2004/0049764 A1 Mar. 11, 2004

(51) Int. Cl.
*G06F 9/44* (2006.01)
*G06F 9/45* (2006.01)
(52) U.S. Cl. ...................... 717/116; 717/152
(58) Field of Classification Search ........ 717/101–105, 717/114–116, 120, 121, 136, 140–144, 151–154, 717/159, 161
See application file for complete search history.

(56) References Cited

U.S. PATENT DOCUMENTS 6,412,105 B1 * 6/2002 Maslennikov et al. ...... 717/151

OTHER PUBLICATIONS

"Effective Java Programming", Joshua Bloch, Jun. 16, 2002 as retrieved from the Internet @http://java.sun.com/developer/Books/shiftintojava/ on Jul. 22, 2005.*
Publication entitled "Effective Java," by Joshua Bloch, Addison-Wesley, Sun Microsystems, Inc., 2001, Chapter 5, pp. 104-114.
"Enumerated Types in Java", XP-007900625, pp. 1-15, http://web.archive.org/web/200108013057, 2001.
"A Typesafe Enum Facility for the Java Programming Language", XP-007900624, pp. 1-8, http://web.archive.org/web/20021219, 2002.
"Substitutes for C Constructs", XP-007900623, pp. 97-117, 2001.
* cited by examiner

*Primary Examiner*—Tuan Dam
*Assistant Examiner*—John Romano
(74) *Attorney, Agent, or Firm*—Park, Vaughan & Fleming LLP

(57) ABSTRACT

One embodiment of the present invention provides a system that facilitates use of an object-oriented enumerated type within a computer program. During operation, the system receives source code for the computer program, wherein the source code contains a declaration for an enumerated type. This declaration specifies a fixed number of enumeration constants that comprise the enumerated type. Next, the system defines the enumerated type using a class defined within an object-oriented programming language, wherein the class includes a constant for each enumeration constant specified in the declaration. If the declaration additionally contains one or more method declarations, these methods are present on the defined class.

31 Claims, 3 Drawing Sheets

OBJECT-ORIENTED ENUMERATED TYPE FACILITY

BACKGROUND

1. Field of the Invention

The present invention relates to programming languages for computer systems. More specifically, the present invention relates to a method and an apparatus for facilitating use of an object-oriented enumerated type within a programming language.

2. Related Art

An enumerated type facility within a programming language allows a programmer to easily create types that include a fixed number of enumeration constants. For example, an enumerated type can define a fixed set of colors, such as RED, WHITE and BLUE. In general, an enumerated type can be used to represent many things, including natural enumerations (e.g., the four seasons) and program-specific enumerations (e.g., the states in a finite state machine).

Many programming languages, including C, C++, Ada and C# provide enumerated type facilities. However, in all of these facilities, enumerated types are merely thinly disguised integers. Some of these languages, including C++, Ada and C#, provide some measure of type safety and a few pieces of built-in functionality, such as automatic string conversion, but none allow for programmer extensibility.

Programmers in object-oriented languages sometimes implement more powerful enumerated types manually by writing classes that export self-typed constants to serve as enumeration constants. For example, item 21 in "Effective Java Programming", by Joshua Bloch, pp. 104-114, Addison-Wesley 2001, discusses one such method of using a "Typesafe Enum" pattern.

While enumerated types implemented in this way are more powerful than traditional enumerated types, they have a number of drawbacks: (1) they require substantial programming effort to produce code to define the classes; (2) the additional code required to define the classes makes the code less readable; (3) the additional code may introduce errors into the program; and (4) enumerated types defined in this way are not usable in all contexts where traditional types are used. In particular, they may not be used in a multi-way branch statement (also referred to as a "switch statement" or a "case statement").

What is needed is a method and an apparatus for providing powerful enumerated types without the drawbacks of involved in manually defining classes to support the enumerated types.

SUMMARY

One embodiment of the present invention provides a system that facilitates use of an object-oriented enumerated type within a computer program. During operation, the system receives source code for the computer program, wherein the source code contains a declaration for an enumerated type. This declaration specifies a fixed number of enumeration constants that comprise the enumerated type. Next, the system defines the enumerated type using a class defined within an object-oriented programming language, wherein the class includes a self-typed constant for each enumeration constant specified in the declaration. If the declaration additionally contains one or more method declarations, these methods are present on the defined class.

In a variation on this embodiment, if the source code specifies a multi-way branch statement associated with the enumerated type, the system implements the multi-way branch statement so that different enumeration constants are associated with different cases of the multi-way branch statement. In a further variation, implementing the multi-way branch statement involves using a translation table to implement the multi-way branch statement efficiently while preserving binary compatibility in cases where the enumerated type evolves.

In a variation on this embodiment, if the source code defines a method associated with the enumerated type, the system augments the class with the method.

In a variation on this embodiment, the system uses one or more methods associated with the class to implement an interface.

In a variation on this embodiment, if the source code defines a field associated with the enumerated type, the system augments the class to include the field.

In a variation on this embodiment, the system associates a different concrete method with each enumeration constant, if such concrete methods are specified in the source code. In this way, invoking the same abstract method on different enumeration constants can cause different concrete methods to execute.

In a variation on this embodiment, the method is performed during a pre-compilation operation.

In a variation on this embodiment, the method is performed during a compilation operation.

In a variation on this embodiment, the class includes a public static final self-typed field for each enumeration constant.

In a variation on this embodiment, the class does not include any public constructors.

Hence, the present invention can offer most of the advantages of the Typesafe Enum pattern:
1. Compile-time type safety.
2. Performance comparable to int constants.
3. Type system provides a namespace for each enum type, so you don't have to prefix each constant name.
4. Typesafe constants aren't compiled into clients, so you can add, reorder or even remove constants without the need to recompile clients. (If you remove a constant that a client is using, you'll fail fast with an informative error message.)
5. Printed values are informative.
6. Enum constants can be used in collections (e.g., as HashMap keys).
7. You can add arbitrary fields and methods to an enum class.
8. An enum type can be made to implement arbitrary interfaces.

Additionally, the present invention can rectify two shortcomings of the Typesafe Enum pattern:
1. The proposed construct is simple and readable.
2. The proposed construct can be used with multi-way branch statements.

Also note that the proposed facility can be implemented in the compiler with support from libraries.

Table 1 illustrates the structure of an enum declaration in accordance with an embodiment of the present invention.

Table 2 illustrates a new production for a switch statement in accordance with an embodiment of the present invention.

Table 3 illustrates automatically generated fields for an enum declaration in accordance with an embodiment of the present invention.

Table 4 illustrates an exemplary enum declaration in accordance with an embodiment of the present invention.

Table 5 illustrates an example including a switch statement in accordance with an embodiment of the present invention.

Table 6 illustrates a rich playing card class built atop two simple enum types in accordance with an embodiment of the present invention.

Table 7 illustrates use of an enhanced for statement in accordance with an embodiment of the present invention.

Table 8 illustrates a program that exercises the card class in accordance with an embodiment of the present invention.

Table 9 illustrates declaring methods on individual enum constants in accordance with an embodiment of the present invention.

Table 10 illustrates a multi-way if statement to implement a switch statement in accordance with an embodiment of the present invention.

Table 11 illustrates another implementation of a switch statement in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs and DVDs (digital versatile discs or digital video discs).

Computer System

Figure 1:
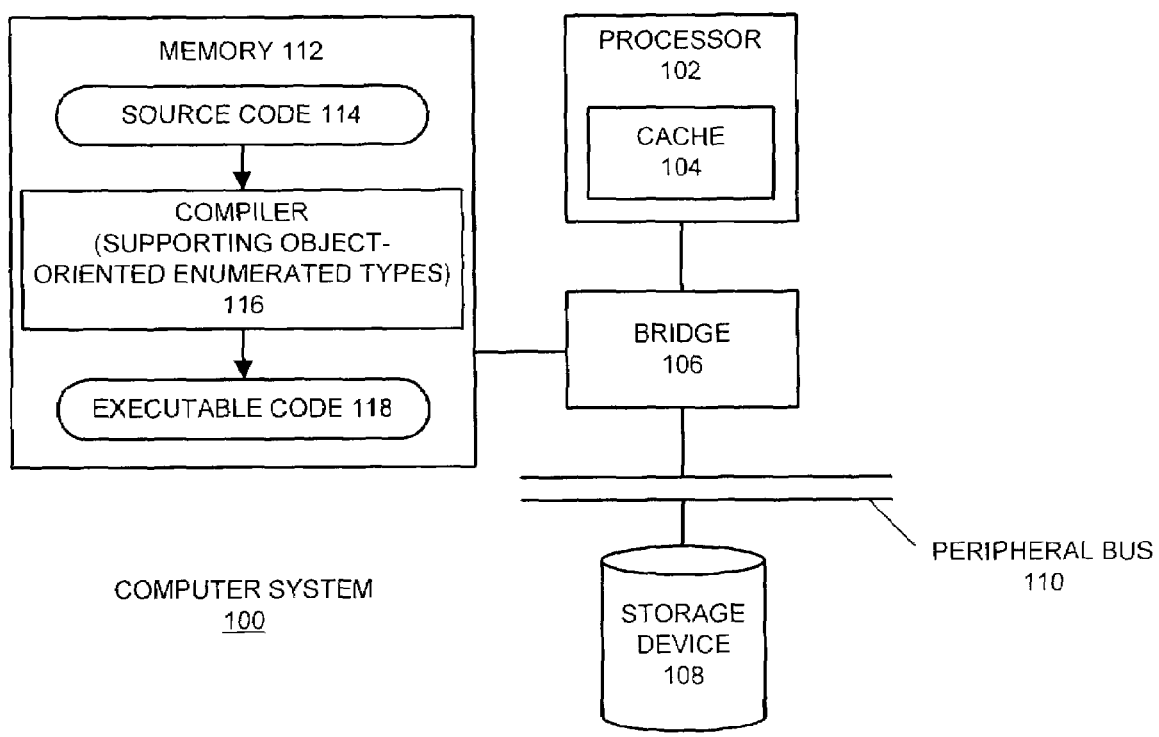
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes a cache 104 that stores code and data for execution by processor 102.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102.

As illustrated in FIG. 1, memory 112 contains compiler 116. Compiler 116 converts source code 114 into executable code 118. In doing so, compiler 116 facilitates the use of object-oriented enumerated types. This process is described in more detail below with reference to FIG. 3.

Note that although the present invention is described in the context of computer system 100 illustrated in FIG. 1, the present invention can generally operate on any type of computing device. Hence, the present invention is not limited to the specific implementation of computer system 100 illustrated in FIG. 1.

Compiler

Figure 2:
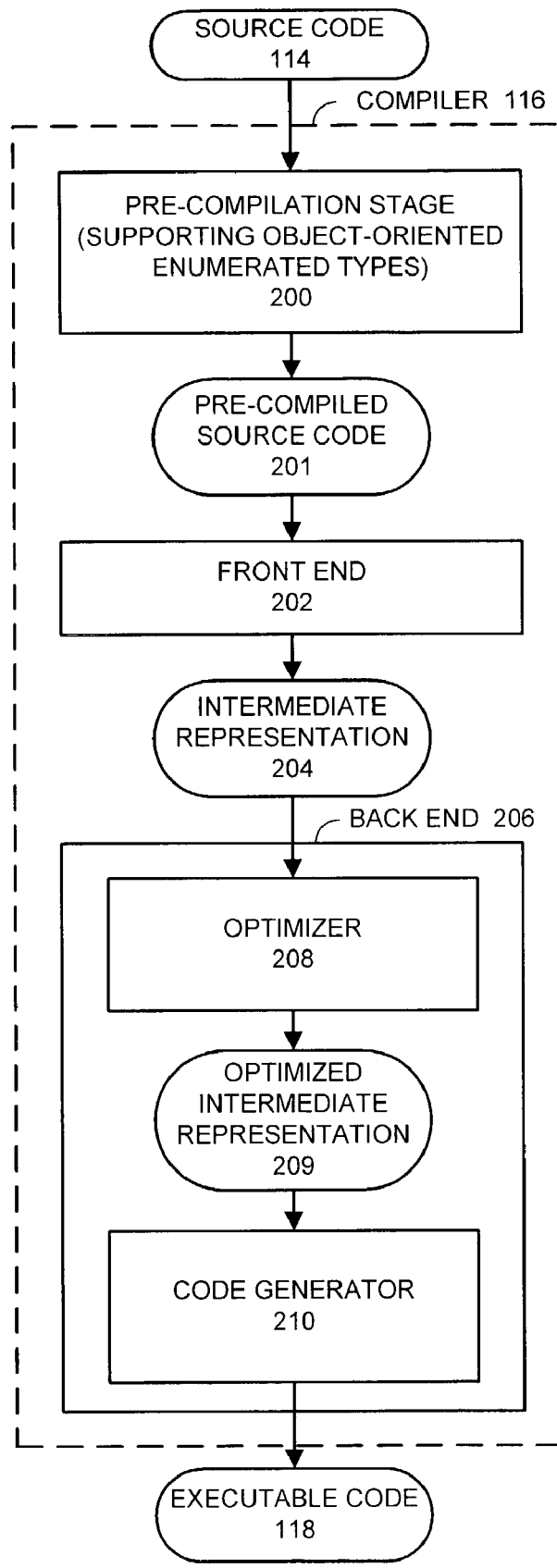
FIG. 2 illustrates the structure of a compiler in accordance with an embodiment of the present invention.

FIG. 2 illustrates the structure of compiler 116 in accordance with an embodiment of the present invention. Compiler 116 takes as input source code 114 and outputs executable code 118. Note that source code 114 may include any computer program written in a high-level programming language, such as the JAVA programming language. Executable code 118 includes executable instructions for a specific virtual machine or a specific processor architecture.

Compiler 116 includes a number of components, including pre-compilation stage 200, front end 202 and back end 206. Pre-compilation stage 200 receives source code 114 and performs a number of pre-compilation operations, such as macro expansions, on source code 114 to produce pre-compiled source code 201. Note that pre-compilation stage 200 provides support for object-oriented enumerated types as is described in more detail below with reference to FIG. 3.

Front end 202 receives pre-compiled source code 201 from pre-compilation stage 200 and parses pre-compiled source code 201 to produce intermediate representation 204.

Intermediate representation 204 is received by back end 206, which operates on intermediate representation 204 to produce executable code 118. During this process, intermediate representation 204 feeds through optimizer 208, and the resulting optimized intermediate representation 209 is passed to code generator 210.

Process of Defining and Object-Oriented Enumerated Type

Figure 3:
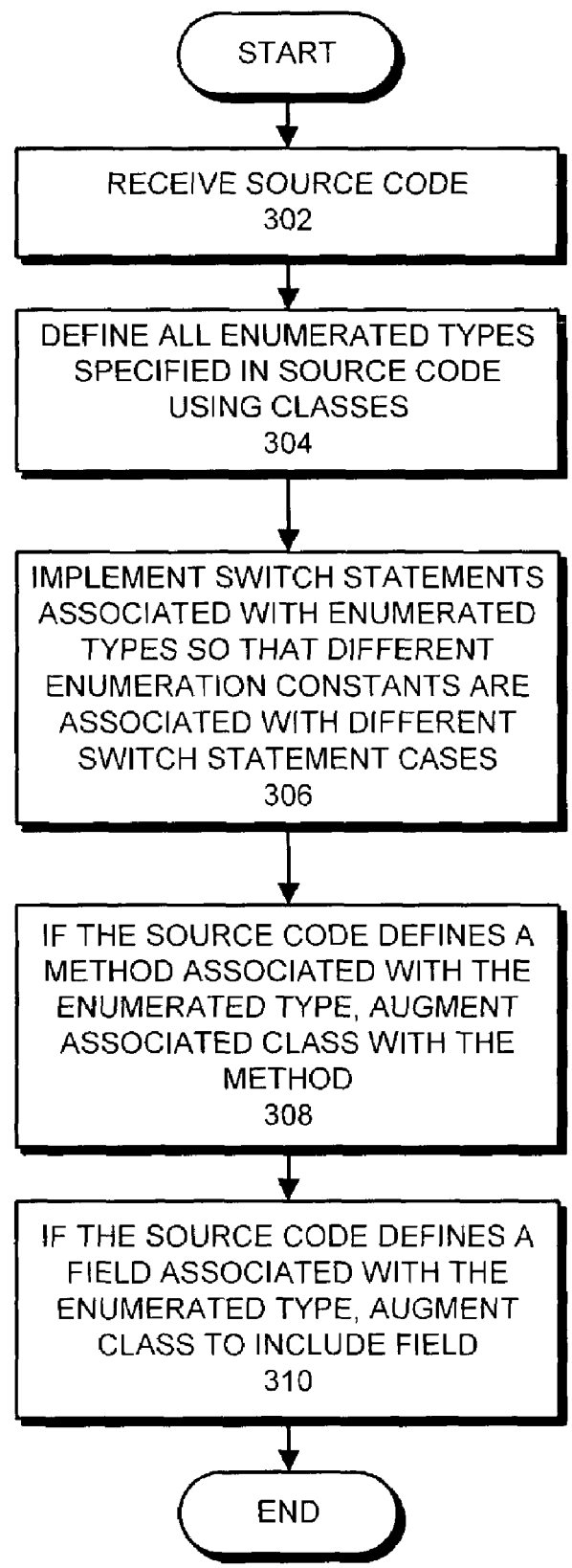
FIG. 3 is a flow chart illustrating the process of defining an object-oriented enumerated type in accordance with an embodiment of the present invention.

FIG. 3 is a flow chart illustrating the process of defining an object-oriented enumerated type in accordance with an embodiment of the present invention. During this process, the system receives source code for a program (step 302).

Next, the system defines enumerated types specified in the source code using classes (step 304). This can be done for example by substituting class definitions for the enumerated type declarations during a pre-compilation operation. Note that the enumerated type declaration can look like a C++ enum declaration: "Public enum Suit {clubs, diamonds, hearts, spades}".

The system also implements multi-way branch statements (switch statements) involving enumerated types that are defined in the source code (step 306). For a given enumerated type, this may involve associating different enumeration constants with different cases of the multi-way branch statement.

Next, for each method defined within the source code that is associated with an enumerated type, the system augments the associated class with the method (step 308). For example, the source code can define constructors or accessor methods for the class.

Similarly, for each field defined within the source code that is associated with an enumerated type, the system augments the associated class with the field (step 310).

The above-described process is described in more detail below in the following sections. Note that any restrictions on the implementation discussed in the following sections are not meant to restrict the present invention in general; they are limited in scope to the implementation described below.

EXAMPLE SYNTAX

In one embodiment of the present invention, a new type of class declaration called an enum declaration is permitted wherever a class declaration is now permitted as is illustrated in Table 1 below.

TABLE 1

EnumDeclaration:
    ClassModifiers$_{opt}$ enum Identifier Interfaces$_{opt}$ EnumBody
Enum Body:
    { EnumConstants$_{opt}$ EnumBodyDeclarations$_{opt}$ }
EnumConstants:
    EnumConstant
    EnumConstants , EnumConstant
EnumConstant:
    Identifier Arguments$_{opt}$ ClassBody$_{opt}$
Arguments:
    ( ArgumentList$_{opt}$ )
EnumBodyDeclarations:
    ; ClassBodyDeclarations$_{opt}$ The use of class modifiers in enum declarations is as for class declarations, with a few additional restrictions. All enum declarations are implicitly final unless they contain constant-specific class bodies (which result in implicit subclasses). It is permissible to use the final modifier on an enum declaration without constant-specific class bodies, but it has no effect (and is discouraged). Enum declarations may not use the class modifier abstract unless they contain constant-specific class bodies for every enum constant, and any abstract methods declared in the (optional) class body declarations are overridden in all the constant-specific class bodies. Enum member classes are implicitly static. Regardless of what class modifiers are used, it is illegal to explicitly instantiate an enum (using new).

Any class body declarations in an enum declaration apply to the enum type exactly as if they had been present in the class body of an ordinary class declaration. There are few restrictions on the members that may be declared in the class body declarations of an enum type. Constructors must not chain to a superclass constructor—chaining is handled automatically by the compiler. Note, however, that one constructor for an enum class may chain to another. (The optional class body of an enum constant is effectively an anonymous class declaration, and may not contain any constructors.)

An enum constant may be followed by arguments, which are passed to the constructor when the constant is created. A constructor is chosen using the normal overloading rules. If the arguments are omitted, an empty argument list is assumed. If the enum class has no constructor declarations, a parameterless default constructor is provided (which matches the implicit empty argument list).

Enum declarations may not contain members that conflict with automatically generated members: VALUES, family ( ), readObject (ObjectInputStream), and writeObject (ObjectOutputStream). (Similarly, enum declarations may not contain members that conflict with final methods in java.util.Enum: equals (Object), hashcode( ) ( ), clone ( ), compareTo (Object), and readResolve( ).) Finally, enum declarations may not contain fields named ordinal and name (which would hide the like-named fields in java.util.Enum).

The serialized form of an enum constant consists of its name. If deserialization is attempted and no constant of the correct type exists with the serialized name, deserialization fails with an InvalidObjectException. Deserialization will not be compromised by reordering of enum constants, addition of enum constants, or removal of unused enum constants.

The syntax of the switch statement is extended ever-so-slightly. The type of the Expression is now permitted to be an enum class. A new production is added as is illustrated in Table 2 below. The ClassName in an EnumConst must refer to an enum class. The Identifier must correspond to one of its enumeration constants.

TABLE 2

SwitchLabel:
    SwitchLabel:
        case EnumConst :
    EnumConst:
        ClassName . Identifier
        Identifier

EXAMPLE SEMANTICS

An enum declaration declares an enum class with the same visibility as a class declaration at the same point with the same access modifiers. Any members declared in the (optional) class body have the same visibility as they would have in a class declaration at the same point with the same access modifiers. Constant-specific class bodies define anonymous classes inside enum classes that extend the enclosing enum class. Thus, instance methods declared in these class bodies are accessible outside the bodies only if they override accessible methods in the enclosing enum class. Static methods and fields declared in constant-specific class bodies are never accessible outside the class body in which they're declared.

In addition to the members it inherits from Enum, the enum class has a public static final "self-typed" field for each declared enum constant. Enum classes may not be instantiated using new, may not be cloned, and take full control of the serialization and de-serialization process. This ensures that no instances exist beyond those made available via the aforementioned fields. Because there is one instance for each value, it is permissible to use the == operator in place of the equals method when comparing two object references, at least one of which refers to an enum constant.

The enum class has the following fields generated automatically as is illustrated in Table 3 below.

TABLE 3

```
/**
 * An immutable list containing the values comprising this
 * enum class in the order they're declared. This field may
 * be used to iterate over the constants as follows:
 *
 *     for(className c : className.VALUES)
 *         System.out.println(c);
 */
```

TABLE 3-continued

```
public static List<this enum class> VALUES;
/**
* Returns an immutable list containing the values comprising
* this enum class in the order they're declared. This
* instance method simply returns VALUES. Few programmers
* should have any need to use this method. It is provided
* for use by sophisticated enum-based data structures to
* prevent the need for reflective access to VALUES.
*
* @return an immutable list containing the values comprising
*         this enum class, in the order they're declared.
*/
public final List<this enum class> family( );
/**
* Static factory to return the enum constant pertaining to
* the given string name. The string must match exactly an
* identifier used to declare an enum constant in this type.
*
* @throws IllegalArgumentException if this enum class has no
*         constant with the specified name.
*/
public static <this enum class> valueOf(String name);
```

USAGE EXAMPLES

Here is a typical enum declaration:

public enum Season {winter, spring, summer, fall}

Here is a slightly more complex enum declaration for an enum type with an explicit instance field and an accessor for this field. Each member has a different value in the field, and the values are passed in via a constructor. In this example, which is illustrated in Table 4, the field represents the value, in cents, of an American coin.

TABLE 4

```
public enum Coin {
    penny (1), nickel (5), dime (10), quarter (25) ;
    Coin (int value) { this.value = value; }
    private final int value;
    public int value ( ) { return value; }
}
```

Switch statements are useful for simulating the addition of a method to an enum type from outside the type. This example, which is illustrated in Table 5, "adds" a color method to the Coin class, and prints a table of coins, their values, and their colors.

TABLE 5

```
import java.util.* ;
public class CoinTest {
    public static void main (String [] args) {
        for (Iterator<Coin> i=Coin.VALUES.iterator ( ) ;
        i.hasNext ( ) ; ) {
            Coin c = i.next ( ) ;
            System.out.println (c+" : \t"+ c.value ( ) +"c
            \t"+color (c) ) ;
        }
    }
    private enum CoinColor { copper, nickel, silver }
    private static CoinColor color (Coin c) {
        if (c == null)
            throw new NullPointerException ( ) ;
        switch (c) {
            case Coin.penny:
                return CoinColor.copper;
            case Coin.nickel:
                return CoinColor.nickel;
```

TABLE 5-continued

```
            case Coin.dime:
                return CoinColor.silver;
            case Coin.quarter:
                return CoinColor.silver;
        }
        throw new AssertionError ("Unknown coin: " + c) ;
    }
}
```

Running the program prints:

penny: 1c copper nickel: 5c nickel dime: 10c silver quarter: 25c silver

In the example illustrated in Table 6, a rich playing card class is built atop two simple enum types. Note that each enum type would be as long as the entire example in the absence of the enum facility.

TABLE 6

```
public class Card implements Comparable, java.io.Serializable {
    public enum Rank  { deuce, three, four, five, six, seven,
                        eight, nine, ten, jack, queen, king, ace }
    public enum Suit   { clubs, diamonds, hearts, spades }
    private Rank rank;
    private Suit suit;
    private Card (Rank rank, Suit suit) {
        if (rank == null || suit == null)
            throw new NullPointerException (rank + " , " + suit) ;
        this.rank = rank;
        this.suit = suit;
    }
    public Rank rank( ) { return rank; }
    public Suit suit ( ) { return suit; }
    public String toString ( ) { return rank + " of " + suit; }
    public int compareTo (Object o) {
        Card c = (Card) o;
        int rankCompare = rank.compareTo (c.rank) ;
        return rankCompare !=0?rankCompare:suit.compareTo (c. suit) ;
    }
    private static List<Card> sortedDeck=new ArrayList<Card> (52) ;
    static {
        for (Iterator<Rank> i=Rank.VALUES.iterator ( ) ;
        i.hasNext ( ) ; ) {
            Rank rank = i.next ( ) ;
            for (Iterator<Suit> j=Suit.VALUES.iterator ( ) ;
            j.hasNext ( ) ; )
                sortedDeck.add (new Card (rank, j.next ( ) ) ) ;
        }
    }
    // Returns a shuffled deck
    public static List<Card> newDeck ( ) {
        List<Card> result = new ArrayList<Card> (sortedDeck) ;
        Collections.shuffle (result) ;
        return result;
    }
}
```

If the enhanced for-statement (commonly known as "foreach") were available, the loop to initialize the sorted deck would be much prettier as is illustrated in Table 7.

TABLE 7

```
static {
    for (Rank rank : Rank.VALUES)
        for (Suit suit : Suit.VALUES)
            sortedDeck.add (new Card (rank, suit) ) ;
}
```

Table 8 illustrates a little program that exercises the Card class. It takes two integer parameters on the command line, representing the number of hands to deal and the number of cards in each hand.

TABLE 8

```
import java.util.*;
class Deal {
    public static void main (String args [] ) {
        int numHands      = Integer.parseInt (args [0] );
        int cardsPerHand  = Integer.parseInt (args [1] );
        List<Card> deck   = Card.newDeck ( );
        for (int i=0; i < numHands; i++)
            System.out.println (dealHand (deck, cardsPerHand) );
    }
    /**
     * Returns a new general-purpose list consisting of the last n
     * elements of deck. The returned list is sorted using the
     * elements natural ordering.
     */
    public static <E> List<E> dealHand (List<E> deck, int n) {
        int deckSize = deck.size ( );
        List<E> handView = deck.subList (deckSize-n, deckSize) ;
        List<E> hand = new ArrayList<E> (handView) ;
        handView.clear ( ) ;
        Collections.sort (hand) ;
        return hand;
    }
}
```

Running the program produces results like this:
java Deal 4 5
[four of spades, nine of clubs, nine of spades, queen of spades, king of spades]
[three of diamonds, five of hearts, six of spades, seven of diamonds, king of diamonds]
[four of diamonds, five of spades, jack of clubs, ace of diamonds, ace of hearts]
[three of hearts, five of diamonds, ten of hearts, jack of hearts, queen of hearts]

Note that it is also possible to declare methods on individual enum constants to attach behaviors to the constants as is illustrated in Table 9.

TABLE 9

```
import java.util.*;
public abstract enum Operation {
    PLUS {
        double eval (double x, double y) { return x + y; }
    } ,
    MINUS {
        double eval (double x, double y) { return x - y; }
    } ,
    TIMES {
        double eval (double x, double y) { return x * y; }
    } ,
    DIVIDED_BY {
        double eval (double x, double y) { return x / y; }
    } ;
    // Perform arithmetic operation represented by this constant
    abstract double eval (double x, double y) ;
    public static void main (String args [] ) {
        double x = Double.parseDouble (args [0] ) ;
        double y = Double.parseDouble (args [1] ) ;
        for (Iterator<Operation> i=VALUES.iterator ( ) ;
            i.hasNext ( ) ; ) {
            Operation op = i.next ( ) ;
            System.out.println (x+" "+op+" "+y+" = "+op.eval (x, y) ) ;
        }
    }
}
```

Running this program produces the following output:
java Operation 2.0 4.0
2.0 PLUS 4.0=6.0
2.0 MINUS 4.0=−2.0
2.0 TIMES 4.0=8.0
2.0 DIVIDED_BY 4.0=0.5

The above pattern is suitable for moderately sophisticated programmers. It is admittedly a bit tricky, but it is much safer than using a case statement in the base class (Operation), as the pattern precludes the possibility of forgetting to add a behavior for a new constant (you'd get a compile-time error).

Implementation Issues

Within the same compilation unit containing an enum class declaration, switch statements on enums can easily be compiled down to ordinary switch statements, as it is guaranteed that no constants will be added, removed, or reordered from the enum class after the switch statement is compiled. Thus, the ordinals implied by the declarations are guaranteed to be correct at run time. Outside of the compilation unit, there are at least two choices. (1) One is to compile the switch statement down to a "multi-way if-statement" as is illustrated in Table 10 below.

TABLE 10

```
if (<expr>.ordinal == Color.RED.ordinal) {
    ...
} else if (<expr>.ordinal == Color.GREEN.ordinal) {
    ...
} else if (<expr>.ordinal == Color.BLUE.ordinal) {
    ...
} else {
    ... // default case
}
```

The .ordinal after each enum expression is superfluous, but enables a JVM compiler optimization, wherein the JVM compiler recognizes at class

TABLE 11

```
private static class $whatever {
    static int [] permutation = new int [Color.VALUES.size ( ) ] ;
    static {
        permutation [Color.RED.ordinal]   = 1;
        permutation [Color.BLUE.ordinal]  = 2;
        permutation [Color.GREEN.ordinal] = 3;
    }
}
switch ($whatever.permutation [<expr>.ordinal] ) {
    case 1: // RED
        ...
    case 2: // BLUE
        ...
    case 3: // GREEN
        ...
    default:
        ...
}
``` initialization time that a case statement may be substituted for the if-statement.

An intriguing alternative that might offer similar performance with no support from the virtual machine is to use an extra layer of indirection as is illustrated in Table 11 above. Each switch statement outside of the compilation unit containing the enum class declaration will compile down to a switch statement on an array reference. This array will be initialized lazily.

This approach has higher "fixed cost" per case-statement and higher footprint, but low cost per execution of the case statement.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating compilation and use of an object-oriented enumerated type within a computer program, comprising:
   receiving source code for the computer program, wherein the source code contains a declaration for an enumerated type;
   wherein the declaration specifies a fixed number of enumeration constants that comprise the enumerated type, wherein the computer automatically generates the enumerated type comprising a class defined within an object oriented programming language, wherein the class includes a self-typed constant for each enumeration constant specified in the declaration and includes methods for operating on those constants;
   defining the enumerated type using a class defined within an object-oriented programming language, wherein the class includes a self-typed constant for each enumeration constant specified in the declaration; and
   if the source code specifies a multi-way branch statement associated with the enumerated type, implementing the multi-way branch statement as a switch statement so that different enumeration constants are associated with different cases of the switch statement.

2. The method of claim 1, wherein implementing the multi-way branch statement involves using a translation table to implement the multi-way branch statement efficiently while preserving binary compatibility in cases where the enumerated type evolves.

3. The method of claim 1, wherein if the source code defines a method associated with the enumerated type, the method further comprises augmenting the class with the method.

4. The method of claim 1, further comprising using one or more methods associated with the class to implement an interface.

5. The method of claim 1, wherein if the source code defines a field associated with the enumerated type, the method further comprises augmenting the class to include the field.

6. The method of claim 1, further comprising associating a different concrete method with each enumeration constant, if such concrete methods are specified in the source code, so that invoking the same abstract method on different enumeration constants can cause different concrete methods to execute.

7. The method of claim 1, wherein the method is performed during a pre-compilation operation.

8. The method of claim 1, wherein the method is performed during a compilation operation.

9. The method of claim 1, wherein the class includes a public static final self-typed field for each enumeration constant.

10. The method of claim 1, wherein the class does not include any public constructors.

11. A computer-readable storage medium storing instructions that when executed by a computer cause the computer to perform a method for facilitating compilation and use of an object-oriented enumerated type within a computer program, the method comprising:
    receiving source code for the computer program, wherein the source code contains a declaration for an enumerated type;
    wherein the declaration specifies a fixed number of enumeration constants that comprise the enumerated type; wherein the computer automatically generates the enumerated type comprising a class defined within an object oriented programming language, wherein the class includes a self-typed constant for each enumeration constant specified in the declaration and includes methods for operating on those constants;
    defining the enumerated type using a class defined within an object-oriented programming language, wherein the class includes a self-typed constant for each enumeration constant specified in the declaration; and
    if the source code specifies a multi-way branch statement associated with the enumerated type, implementing the multi-way branch statement as a switch statement so that different enumeration constants are associated with different cases of the switch statement.

12. The computer-readable storage medium of claim 11, wherein implementing the multi-way branch statement involves using a translation table to implement the multi-way branch statement efficiently while preserving binary compatibility in cases where the enumerated type evolves.

13. The computer-readable storage medium of claim 11, wherein if the source code defines a method associated with the enumerated type, the method further comprises augmenting the class with the method.

14. The computer-readable storage medium of claim 11, wherein the method further comprises using one or more methods associated with the class to implement an interface.

15. The computer-readable storage medium of claim 11, wherein if the source code defines a field associated with the enumerated type, the method further comprises augmenting the class to include the field.

16. The computer-readable storage medium of claim 11, wherein the method further comprises associating a different concrete method with each enumeration constant, if such concrete methods are specified in the source code, so that invoking the same abstract method on different enumeration constants can cause different concrete methods to execute.

17. The computer-readable storage medium of claim 11, wherein the method is performed during a pre-compilation operation.

18. The computer-readable storage medium of claim 11, wherein the method is performed during a compilation operation.

19. The computer-readable storage medium of claim 11, wherein the class includes a public static final self-typed field for each enumeration constant.

20. The computer-readable storage medium of claim 11, wherein the class does not include any public constructors.

21. An apparatus that facilitates compilation and use of an object-oriented enumerated type within a computer program, comprising:
    a receiving mechanism that is configured to receive source code for the computer program, wherein the source code contains a declaration for an enumerated type;
    wherein the declaration specifies a fixed number of enumeration constants that comprise the enumerated type, wherein the computer automatically generates the enumerated type comprising a class defined within an object oriented programming language, wherein the class includes a self-typed constant for each enumeration constant specified in the declaration and includes methods for operating on those constants;

a class definition mechanism that is configured to define the enumerated type using a class defined within an object-oriented programming language, wherein the class includes a self-typed constant for each enumeration constant specified in the declaration; and an implementation mechanism configured to implement a multi-way branch statement as a switch statement so that different enumeration constants are associated with different cases of the switch statement.

22. The apparatus of claim 21, wherein the multi-way branch mechanism is configured to use a translation table to implement the multi-way branch statement efficiently while preserving binary compatibility in cases where the enumerated type evolves.

23. The apparatus of claim 21, wherein if the source code defines a method associated with the enumerated type, the class definition mechanism is configured to augment the class with the method.

24. The apparatus of claim 21, wherein the class definition mechanism is configured to use one or more methods associated with the class to implement an interface.

25. The apparatus of claim 21, wherein if the source code defines a field associated with the enumerated type, the class definition mechanism is configured to augment the class to include the field.

26. The apparatus of claim 21, wherein the class definition mechanism is configured to associate a different concrete method with each enumeration constant, if such concrete methods are specified in the source code, so that invoking the same abstract method on different enumeration constants can cause different concrete methods to execute.

27. The apparatus of claim 21, wherein the apparatus is contained within a pre-compilation mechanism.

28. The apparatus of claim 21, wherein the apparatus includes a compiler.

29. The apparatus of claim 21, wherein the class includes a public static final self-typed field for each enumeration constant.

30. The apparatus of claim 21, wherein the class does not include any public constructors.

31. A means for facilitating compilation and use of an object-oriented enumerated type within a computer program, comprising:

a receiving means for receiving source code for the computer program, wherein the source code contains a declaration for an enumerated type;

wherein the declaration specifies a fixed number of enumeration constants that comprise the enumerated type, wherein the computer automatically generates the enumerated type comprising a class defined within an object oriented programming language, wherein the class includes a self-type constant for each enumeration constant specified in the declaration and includes methods for operating on those constants;

a class definition means for defining the enumerated type using a class defined within an object-oriented programming language, wherein the class includes a self-typed constant for each enumeration constant specified in the declaration; and an implementation means for implementing a multi-way branch statement as a switch statement so that different enumeration constants are associated with different cases of the switch statement.

* * * * *